United States Patent
Sørhaug et al.

(10) Patent No.: US 6,424,627 B1
(45) Date of Patent: Jul. 23, 2002

(54) FULL-DUPLEX MEDIUM TAP APPARATUS AND SYSTEM

(75) Inventors: Asbjørn Sørhaug, Gronton, MA (US); Aleksandr L. Kupchik, Nashua, NH (US)

(73) Assignee: Metrobility Optical Systems, Merrimack, NH (US)

(*) Notice: Subject to any disclaimer, the term of this patent is extended or adjusted under 35 U.S.C. 154(b) by 0 days.

(21) Appl. No.: 08/805,167

(22) Filed: Feb. 24, 1997

(51) Int. Cl.[7] .......................... H04L 12/26; H04M 1/24; G06F 15/173
(52) U.S. Cl. ................. 370/241; 370/282; 379/1.03; 379/32.01; 709/224
(58) Field of Search ............................. 370/282, 241, 370/242, 248, 249, 250, 400, 232, 252, 390; 340/825.01, 825.03, 827; 379/1, 9, 10, 15, 32, 1.01, 1.03, 15.01, 32.01; 709/224, 223, 246

(56) References Cited

U.S. PATENT DOCUMENTS

| | | | |
|---|---|---|---|
| 5,299,257 A | * 3/1994 | Fuller et al. | ................... 379/1 |
| 5,311,593 A | * 5/1994 | Carmi | ........................ 370/400 |
| 5,406,554 A | 4/1995 | Parry | |
| 5,459,723 A | 10/1995 | Thor | |
| 5,923,654 A | * 7/1999 | Schnell | ........................ 370/390 |
| 5,995,488 A | * 11/1999 | Kalkunte et al. | ........... 370/232 |

OTHER PUBLICATIONS

ICS Data Book 1996, pp. F–47 to F–48 part No. ICS1886 Data Sheet.
ICS Internet Web Page, Feb. 1997, Part No. ICS1885/1886 Applications Note.
Nat. Semi. 1994 Data Book, pp. 1–13 to 1–21, Part No. DP83223 Data sheet.

* cited by examiner

Primary Examiner—Wellington Chin
Assistant Examiner—Maikhanh Tran
(74) Attorney, Agent, or Firm—Stephen G. Matzuk

(57) ABSTRACT

A bi-directional network medium monitor including a tap apparatus connected inserted in a network media, e.g. Fiber Optic (FX) and Twisted Pair (TX), comprising a transceiver and a clock recovery element for each medium and medium monitor connection, and a bi-directional serial data multiplexer which directs the medium data while in the serial data format. Also, the medium monitor may interrupt medium data transfer in either medium direction and insert its data for diagnostic or other network purposes. Thus, the apparatus according to the present invention is operable to monitor a network at the maximum data rates currently used while providing no significantly network data delay.

10 Claims, 2 Drawing Sheets

FULL-DUPLEX MEDIUM TAP APPARATUS AND SYSTEM

FIELD OF THE INVENTION

The present invention relates to data medium networks, in particular, local and wide area data medium network monitors and taps.

BACKGROUND OF THE INVENTION

Previously, the most widely used approach for monitoring network data was to interpose a network hub 12 and connect a system or network monitor 40 to hub port 16 to monitor the network data, as shown by the exemplary block diagram 10 of FIG. 1. Firstly, the system must have a spare port or tolerate the loss of a port to permit system analysis. In addition, the hub will reject data containing errors and/or will mask out data errors. When a spare port is made available, the interposition of the data hub port introduces significant network data delays, typically in excess of 90 serial data bits, which does not provide a sufficiently accurately or transparent data connection. In many instances, such degradation makes network monitoring unacceptable.

Such data delay limitations experienced by hub and other prior data translation devices are, in large part, a result of internal transfer data from the incoming media serial format to an internal parallel format for buffering or processing, and back to the serial format for retransmission. The well established building blocks used in many such systems consist of a an integrated circuit, e.g. part # DP83223, which provides the necessary electrical signalling and media state, while a second subsequently connected integrated circuit, e.g. part # DP83240, recovers the clock signal from the incoming signal, decodes or descrambles the NRZ, MLT3 or other cipher format encrypted signal and provides a plaintext data signal in a 4-bit parallel standard. The plaintext parallel data is then received by a buffer or processor provided by a variety of integrated circuits. For hub configurations, similar parallel data paths are provided.

Moreover, when attached to a spare port of a hub, the data flow of the channels, e.g. 21, 23, 25, attached to corresponding ports cannot be isolated, so that data is co-mingled and collisions occur, preventing the system monitor or network analyzer from accurately monitoring any channel. Furthermore, data presented to the system monitor via a spare port is only Half-Duplex, which does not monitor a Full-Duplex channel. The hub works in a contention mode and will only allow data to be received from one port to be presented to the monitor port. If any other port attempts to transmit data, such data will be suppressed and the data on the monitor port will be distorted or suppressed in order to indicate a collision event. Also, the system monitor or network analyzer cannot interrupt a single channel data flow to send diagnostic data, or reliably monitor the response of the equipment connected to that channel without incurring interference from data collisions as previously discussed.

As demonstrated by the widespread adherence to the parallel data format by integrated circuit and equipment designers, the limitations imposed on the data flow by translation from and to the parallel format are generally accepted as unavoidable, and thus the performance of data translation equipment is only marginally improved.

SUMMARY OF THE INVENTION

The apparatus and method according to the present invention provide a serially buffered network tap including physical layer devices which provide the necessary media interfacing and clock recovery and a serial stream of data to a serial data multiplexer which provides bit synchronization with a minimal data bit delay, typically 5 bits.

Further, the present invention provides a data monitor system including the tap and a network monitor or system analyzer provides virtually transparent network channel monitoring of the Full-Duplex data flow thereon. Moreover, according to the present invention, the tap provides selective access to the network data flow in either direction according to network monitor or system analyzer control for network system diagnosis, etc. Also, the system monitor or network analyzer can selectively insert data in either direction to provide complete diagnostic testing of the channel.

Having recognized the desirability, and providing the apparatus and method to provide data translation according to the present invention, a total typical translated data delay time of 10 bits or less is achieved. When compared to the typical 4-bit parallel data systems data typical delay of at least 45 bits, the apparatus of the present invention provides a significant improvement.

BRIEF DESCRIPTION OF THE DRAWING

These and further features of the present invention will be better understood by reading the following Detailed Description together with the Drawing, wherein.

DETAILED DESCRIPTION OF THE INVENTION

Figure 1:
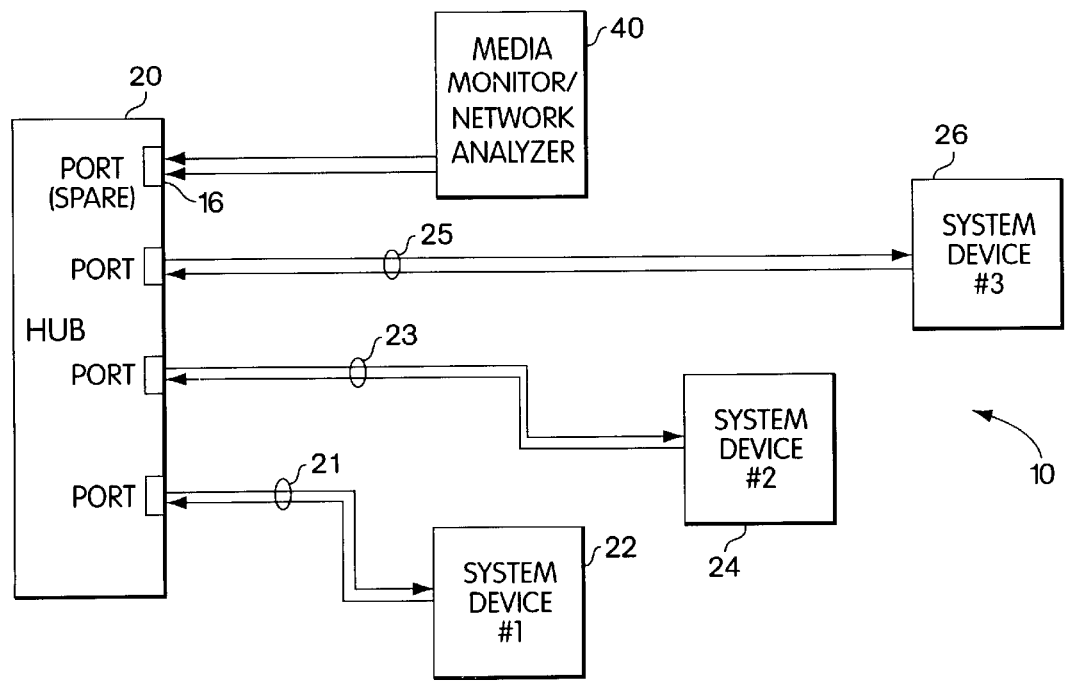
FIG. 1 is a block diagram of a typical prior art network analysis configuration.
Figure 2:
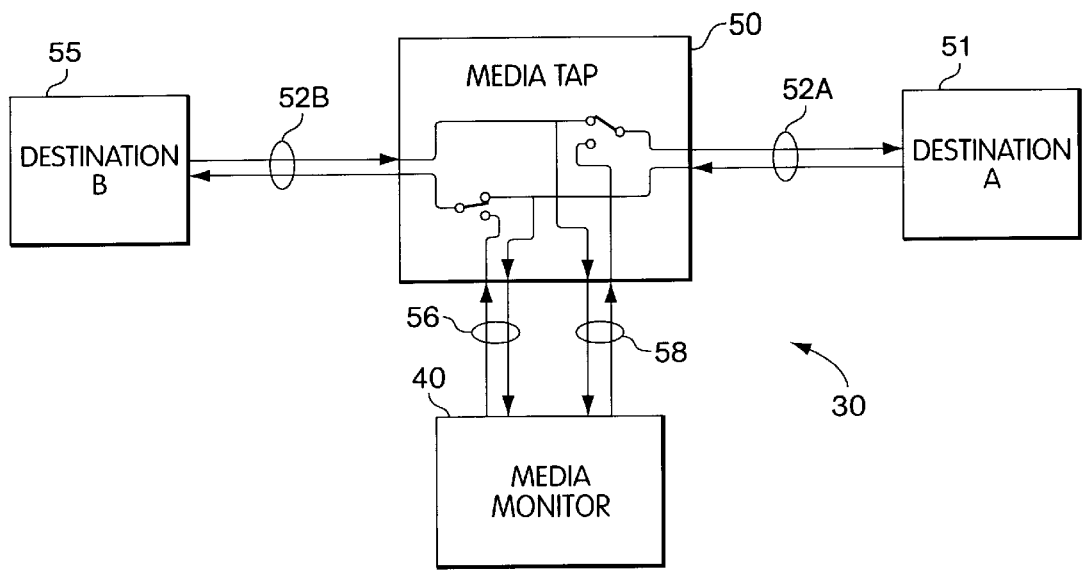
FIG. 2 is a block diagram of one embodiment of the present invention providing a monitor system in a bi-directional network between two destinations.
Figure 3:
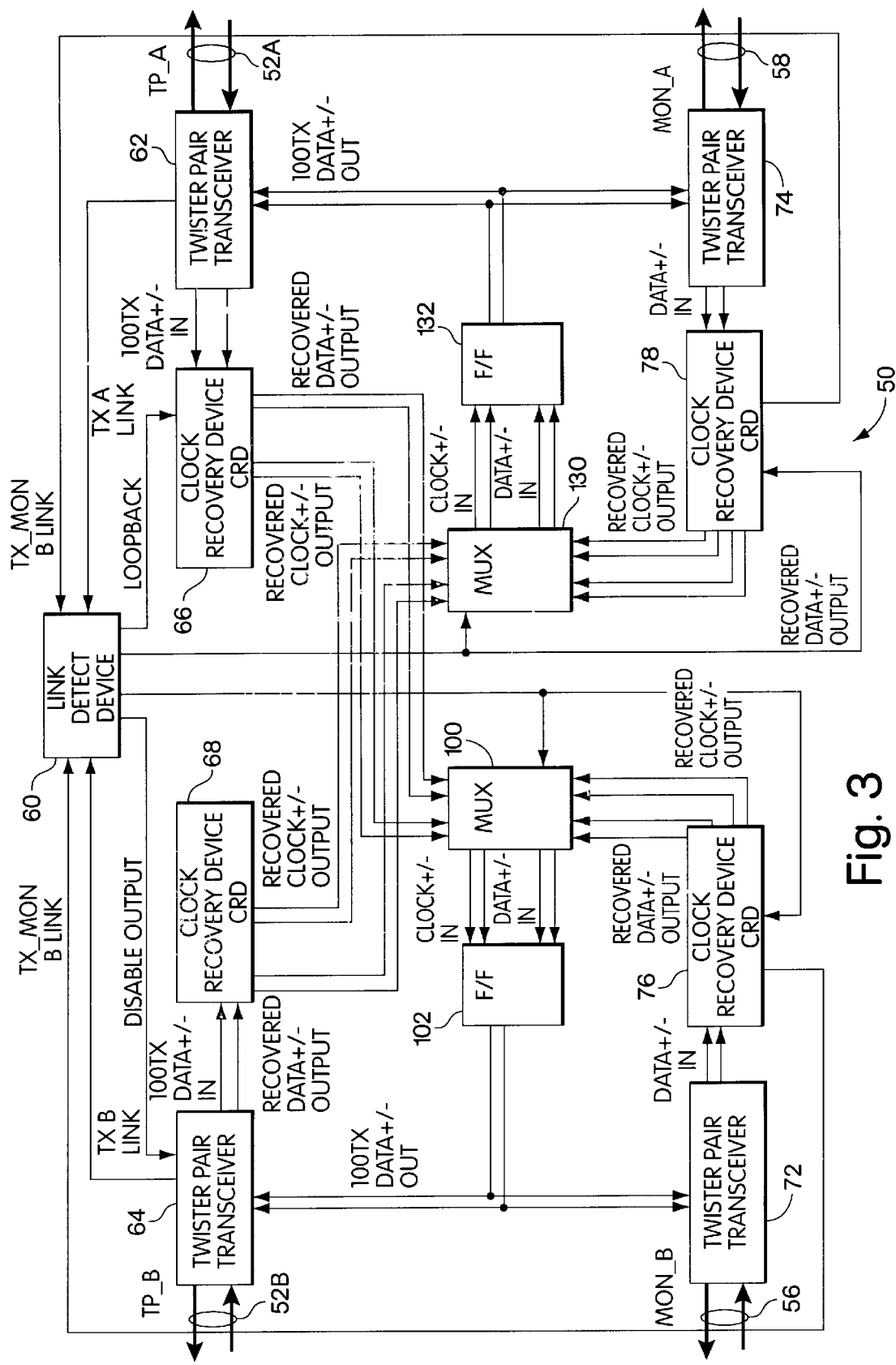
FIG. 3 is a block diagrams of the network tap according to one embodiment of the present invention as used in the system embodiment of FIG. 2.

The preferred embodiment 30 of the present invention as shown in FIG. 2, provides a system for monitoring data from a network medium providing bidirectional data flow between two system devices 51 and 55 as provided in a variety of present wide- or local-area data networks, via a media tap 50 and media data links 52A and 52B together typically comprise a system channel, e.g. 21. Typically, the devices 51 and 55 may each comprise one of a combination of system computers (e.g. 22, 24, 26), hubs (e.g. 20), etc. Corresponding media links 56 and 58 provide a replicated flow to a media monitor of data to system devices 55 and 51. Upon control by the media monitor 40, replacement media data via data links 58 and 56 may be inserted on 52A and 52B instead of data from system devices 55 and 51 according to media monitor 40 control, as described below.

The media monitor 40 typically comprises an Intel® microprocessor platform having a network analyzer/system monitor program, e.g. NETscout™ of Frontier Software of Massachusetts, or equivalent, the product description information thereof being incorporated by reference. Typically, the monitor 40 includes two Full-Duplex network interface cards (NIC), e.g. a DECM™ NIC manufactured by Digital Equipment of Massachusetts, or equivalent DEC™-based NIC connected to the tap via appropriate corresponding media links 56 and 58. Alternately, a single Full-Duplex communication port and single media link may be provided.

Data from and to medium link 52A is received by the media tap 50 via a first transceiver 62, clock recovery device 66, multiplexer 100, synchronizing flip-flop 102, a second transceiver 64 to the second medium link 52B. In the present embodiment, the first and/or second exemplary medium link format is full or half duplex twisted pair compliant with ANSI X3T9.5 TP-PMD and IEEE 802.3 100BASE-TX Ethernet twisted pair specifications; other media formats are supportable according to the present invention such as IEEE 802.3 100BASE-FX, etc. The data provided to transceiver 64 is also received by a third transceiver 72 to be sent via data link 56 to monitor 40.

If it is desired to send diagnostic data through the link 52B of the channel, the monitor 40 returns, via data link 56, signals to the tap 50 transceiver, and is then sent to the associated clock recovery device which, in addition to recovering a clock signal and data, will detect the presence of signals from the system monitor 40. The detected signal then results in a corresponding control signal sent to the link detect circuit 60 which in turn provides a signal to serial multiplexer 100, causing the recovered monitor 40 data and clock signal to be sent to the synchronizing flip-flop 102 for transmission to the system devices 55.

Data from and to medium link 52B is received by the media tap 50 via a second transceiver 64, clock recovery device 68, multiplexer 130, synchronizing flip-flop 132, a first transceiver 62 to the medium first link 52A. The data provided to transceiver 62 is also received by a fourth transceiver 74 to be sent via data link 58 to monitor 40.

As described above with respect to transceiver 72 and data link 56, if the monitor 40 returns any data via data 58 link, a signal which is received by transceiver is sent to the associated clock recovery device such a part no. ICS1886 of Integrated Circuit Systems, Inc., which, in addition to recovering a clock signal and data, will detect signal and send a corresponding control signal to the link detect circuit 60 which in turn provides a signal to serial multiplexer 130, causing the recovered monitor 40 data and clock signal to be sent to the synchronizing flip-flop 132 for transmission to the system devices 51.

The serial multiplexers 100 and 130 typically comprise high speed (e.g. ECL) 2-input 1-output multiplexer logic circuit as known in the art, whose data output signal is sent to the corresponding synchronizing flip-flops 102 and 132 which are clocked by the recovered clock signal, also switched by the multiplexers along with the data signals.

The transceivers 62, 64, 72 and 74 typically comprise integrated circuit systems appropriate for each data medium. In the present embodiment, twisted pair medium transceivers 62, 64, 72 and/or 74 comprise parts no. DP 83223 of National Semiconductor, or equivalent, and the corresponding fiber optic transceivers, if used in place of one or more of the twister pair transceiver, comprises transceiver part no. HFBR-5103-SC by Hewlett-Packard, or equivalent, connected as known in the art to provide and receive serial electrical signals corresponding to the incoming or outgoing medium data. Typically, such transceiver circuits detect medium data signals present, and provide a corresponding signal which is connected to a link detect control circuit 60. If the incoming medium signal fails or becomes unacceptably diminished in quality, the signal on the corresponding path changes. The link detect circuit then provides a 'lost synchronization' signal on path 76 to reset the clock recovery devices 76 and 78.

Alternate embodiments include media taps which correspond to first and second system devices via different media, e.g., to the first system device over one path comprising twisted pair medium and a second path to the second system device comprising fiber optic cable. Accordingly, the media tap transceivers would comprise corresponding media transceivers as known in the art, and the media tap would include serial buffers following and/or in place of the clocking flip-flops 102 and 132 and be clocked by the appropriate clock signal. Additional teaching according to this embodiment and other embodiments of the present invention is provided by the patent application entitled SERIALLY BUFFERED MEDIUM TRANSLATOR, of the present inventors, filed Feb. 11, 1997, and is incorporated by reference.

Further modifications and substitutions made by one of ordinary skill in the art are considered within the scope of the present invention which is not to be limited except by the claims which follow:

What is claimed is:

1. A network monitor system comprising:
   a media tap interposed on the medium and adapted to send and receive data to and from a first and a second system devices, said media tap including
      first means for providing data replicated from one of said first and second system devices to a first data link, and
      first means for selectively providing data from said first data link to one of said first and second system devices according to a control signal; and
   a media monitor connected to said first data link to receive said replicated data, said media monitor also including
      first media monitor means for providing data to said media tap via said first data link,
   said media tap further comprising
      second means for providing data replicated from the other of said first and second system devices to a second data link, and
      second means for selectively providing data from said second data link to the other of said first and second system devices according to a control signal; and
   said media monitor being connected to said second data link to receive said replicated data, said media monitor also including
      second media monitor means for providing data to said media tap via said second data link.

2. A network monitor system comprising:
   a media tap interposed on the medium and adapted to send and receive data to and from a first and a second system devices, said media tap including
      first means for providing data replicated from one of said first and second system devices to a first data link, and
      first means for selectively providing data from said first data link to one of said first and second system devices according to a control signal; and
   a media monitor connected to said first data link to receive said replicated data, said media monitor also including
      first media monitor means for providing data to said media tap via said first data link,
   wherein the monitor comprises a computer having a network monitoring program therein.

3. Apparatus for providing a low-delay media tap, comprising:
   a first transceiver for receiving and transmitting medium data thereon;
   a second transceiver for receiving and transmitting medium data thereon, wherein said first and second transceivers are connected to interrupt a bi-directional data medium connected between a first and second system devices;

a first clock recovery device connected to said first transceiver for providing a recovered clock signal and data from received data from said first transceiver;

a second clock recovery device connected to said second transceiver for providing a recovered clock signal and data from received data from said second transceiver;

a third transceiver connected to a monitor for receiving and transmitting monitor data thereon;

a third clock recovery device connected to said third transceiver for providing a recovered clock signal and data from received data from said monitor;

a first serial data multiplexer for selectively providing one of said second and third clock signal and said second and third data to said first transceiver for transmission on said medium in response to a control signal; and first means for detecting a monitor originated signal and in response thereto, for providing said control signal to said first serial data multiplexer.

4. The apparatus of claim 3, further comprising a fourth transceiver connected to a monitor for receiving and transmitting monitor data thereon;

a fourth clock recovery device connected to said fourth transceiver for providing a recovered clock signal and data from received data from said monitor;

a second serial data multiplexer for selectively providing one of said first and fourth clock signal and said first and fourth data to said second transceiver for transmission on said medium in response to a second control signal; and means for detecting a monitor originated signal and in response thereto, for providing said second control signal to said second serial data multiplexer.

5. The apparatus of claim 3, wherein said means for detecting a monitor originated signal comprises a clock recovery device.

6. A monitored network system, comprising;

a first system device;

a second system device;

a media tap connected to said first system device and said second system device by data media and to provide a bi-directional data flow therebetween, comprising
 a first transceiver connected to said first system device and providing an output therefrom,
 a first data recovery device connected to receive the output of said first transceiver device and providing recovered data therefrom,
 a second transceiver connected to said second system device,
 a first logic means for selectively providing a data flow of recovered data from said first data recovery device to said second transceiver, and
 a monitor transceiver for receiving recovered data from said first logic means and providing a tap output therefrom; and a monitor means connected to receive said media tap output, wherein
 said media tap further includes a data link for selectively providing data from at least one of said first and said second system devices of the data being sent to said first and said second system devices by at least one of the other of said first and said second system devices to said monitor means.

7. The system of claim 6, wherein said monitor means selectively provides a flow of data to said media tap, and said media tap further includes means to selectively interrupt the flow of data between said first and second system devices and provide said monitor means flow of data to at least one of said first and second system devices.

8. The system of claim 6, wherein at least one of said first and second system devices comprises a network hub.

9. The system of claim 6, wherein said media comprises at least one of twisted pair and fiber optic media.

10. The system of claim 6, wherein the data medium connecting said first system device to said media tap and the data medium connecting said second system device to said media tap are different data media.

* * * * *